United States Patent
Saville et al.

(10) Patent No.: US 6,224,263 B1
(45) Date of Patent: May 1, 2001

(54) FOIL THRUST BEARING WITH VARYING CIRCUMFERENTIAL AND RADIAL STIFFNESS

(75) Inventors: Marshall Patton Saville, Torrance; Erik Scott Gundersen, Garden Grove, both of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/235,849

(22) Filed: Jan. 22, 1999

(51) Int. Cl.$^7$ ............................................. F16C 17/04
(52) U.S. Cl. ......................... 384/106; 384/103; 384/105
(58) Field of Search ................................ 384/105, 103, 384/106

(56) References Cited

U.S. PATENT DOCUMENTS

| | | |
|---|---|---|
| 4,227,753 * | 10/1980 | Wilcock .............................. 384/105 |
| 4,247,155 | 1/1981 | Fortmann . |
| 4,262,975 | 4/1981 | Heshmat . |
| 4,277,111 | 7/1981 | Gray et al. . |
| 4,277,112 | 7/1981 | Heshmat . |
| 4,277,113 | 7/1981 | Heshmat . |
| 4,300,806 | 11/1981 | Heshmat . |
| 4,315,359 | 2/1982 | Gray . |
| 4,331,365 | 5/1982 | Miller, Jr. . |
| 4,459,047 | 7/1984 | Silver . |
| 4,462,700 * | 7/1984 | Agrawal .............................. 384/105 |
| 4,597,677 | 7/1986 | Hagiwara et al. . |
| 4,621,930 | 11/1986 | Gu et al. . |
| 4,624,583 | 11/1986 | Saville et al. . |
| 4,668,106 | 5/1987 | Gu . |
| 4,682,900 | 7/1987 | Gu . |
| 4,871,267 | 10/1989 | Gu . |
| 5,110,220 | 5/1992 | Gu . |
| 5,116,143 | 5/1992 | Saville et al. . |
| 5,228,785 * | 7/1993 | Saville et al. .................... 384/106 X |
| 5,248,205 | 9/1993 | Gu et al. . |
| 5,318,366 | 6/1994 | Nadjalf . |
| 5,498,082 | 3/1996 | Nadjafi . |
| 5,547,286 | 8/1996 | Struziak . |
| 5,902,049 | 5/1999 | Heshmat . |
| 5,911,510 * | 6/1999 | Saville ............................. 384/105 X |
| 5,911,511 | 6/1999 | Saville . |

* cited by examiner

Primary Examiner—Charles A. Marmor
Assistant Examiner—Saúl Rodríguez
(74) Attorney, Agent, or Firm—William J. Zak, Jr., Esq.

(57) ABSTRACT

An improved foil thrust bearing having a thrust runner and a thrust plate includes an underspring element positioned adjacent to the thrust plate. The underspring element comprises, in one embodiment, a plurality of alternating first apertures and spring portions, with at least one spring portion having a periodic configuration and comprising a leading edge and a trailing edge. The periodic configuration is defined by a plurality of pitches that vary between the leading and trailing edges. Also defining the periodic configuration is a plurality of periodic elements that vary in longitudinal length between the leading and trailing edges. A thrust bearing disk is disposed intermediate the underspring element and the thrust runner. The disk comprises a plurality of transition areas that provide a stepped configuration to the disk. The transition areas match a plurality of circumferential positions of the first apertures in the underspring.

14 Claims, 3 Drawing Sheets

FOIL THRUST BEARING WITH VARYING CIRCUMFERENTIAL AND RADIAL STIFFNESS

BACKGROUND OF THE INVENTION

The present invention generally relates to bearings and, more particularly, to foil thrust bearings.

The ready availability of ambient atmosphere as a bearing fluid makes fluid bearings particularly attractive for high speed rotating machinery. Some applications might include, for example, a turboalternator-generator and turbocompressor.

Fluid bearings generally comprise two relatively movable elements (i.e., a bearing and a runner). A predetermined spacing between the bearing and runner is filled with a fluid such as air. Foils (or thin sheets of a compliant material) disposed in the spacing are deflected by the hydrodynamic film forces between the adjacent bearing surfaces. The foils thus enhance the hydrodynamic characteristics of the fluid bearing and also provide improved operation under extreme load conditions when normal bearing failure might otherwise occur. Additionally, these foils provide the added advantage of accommodating eccentricity of the relatively movable elements and further provide a cushioning and dampening effect.

To properly position the foils between the movable bearing elements, it has been common to mount a plurality of individually spaced foils on a foil bearing disk and position the disk on one of the bearing elements. Another common practice has been to provide separate compliant stiffener elements or springs beneath the foils to supply the required compliance. Examples of typical foil thrust bearings are shown in U.S. Pat. Nos. 5,547,286; 4,871,267; 4,682,900; 4,668,106; 4,624,583; 4,621,930; 4,597,677; 4,459,047; 4,331,365; 4,315,359; 4,300,806; 4,277,113; 4,277,111; and 4,247,155.

Notwithstanding the inclusion of the above design characteristics, the load capacity of a foil thrust bearing still depends on the compliance of the bearing with pressure exerted by a fluid film developed between the bearing and the runner. The pressure profile for a thrust bearing varies, and in order to accommodate the optimal pressure profile and attendant fluid film thickness associated with maximum load capacity, the thrust bearing should be designed to provide stiffness that varies in a manner similar to the pressure profile.

Current foil thrust bearings have limited load capacity. This limitation results from spring designs that indicate only a limited appreciation for variance in pressure profile and its effect on load capacity. Some spring designs have been directed towards providing varying stiffness in radial directions. Examples of designs for varying radial stiffness are shown in U.S. Pat. Nos. 5,110,220; 4,668,106 and 4,277,112. However, they tend to provide limited load capacity because of excess pad deflection over the spring support points.

In an effort to address the above limitations in spring design, U.S. Pat. No. 5,248,205 provides a plurality of sets of arcuate springs having a corrugated configuration. Rectangular slots are provided in the individual springs, with the number, size and position of the slots being altered. Such alteration is intended to change both the radial and circumferential stiffness of the springs. However, the need for slots with such variation makes manufacturing of the springs cumbersome.

Another attempt at varying both the radial and circumferential stiffness of the spring in a foil thrust bearing is found in U.S. Pat. No. 5,318,366. Therein, a plurality of corrugated springs is provided in sets. Within any one set, the springs have increasing widths towards the outer edge of the foil. And each spring within a set has a decreasing width towards the leading edge of the foil. But the changing configurations within each set of springs and within each individual spring makes manufacturing burdensome.

As can be seen, there is a need for an improved foil thrust bearing. In particular, there is a need for a foil thrust bearing that provides varying circumferential and/or radial stiffness. A further need is for an improved foil thrust bearing that allows for cirumferential stiffness that can correlate to a varying fluid film pressure developed by the bearing. Another need is for a foil thrust bearing that includes an underspring element that can be manufactured by fewer manufacturing steps when compared to the current technology but still provide varying stiffness.

SUMMARY OF THE INVENTION

In an improved foil thrust bearing having a thrust runner and a thrust bearing disk, the present invention provides an underspring element operatively engaged with the disk, and the underspring element comprising at least one spring portion having a periodic configuration, with the spring portion comprising a leading edge and a trailing edge, and the periodic configuration being defined by a plurality of pitches that vary in size between the leading and trailing edges.

Also in an improved foil thrust bearing having a thrust runner and a thrust bearing disk, the present invention provides an underspring element operatively engaged with the disk, and the underspring element comprising at least one spring portion having a periodic configuration, with the spring portion comprising a leading edge and a trailing edge, and the periodic configuration being defined by a plurality of periodic elements that vary in longitudinal size between the leading and trailing edges.

These and other features, aspects and advantages of the present invention will become better understood with reference to the following drawings, description and claims.

DETAILED DESCRIPTION OF THE INVENTION

Figure 1:
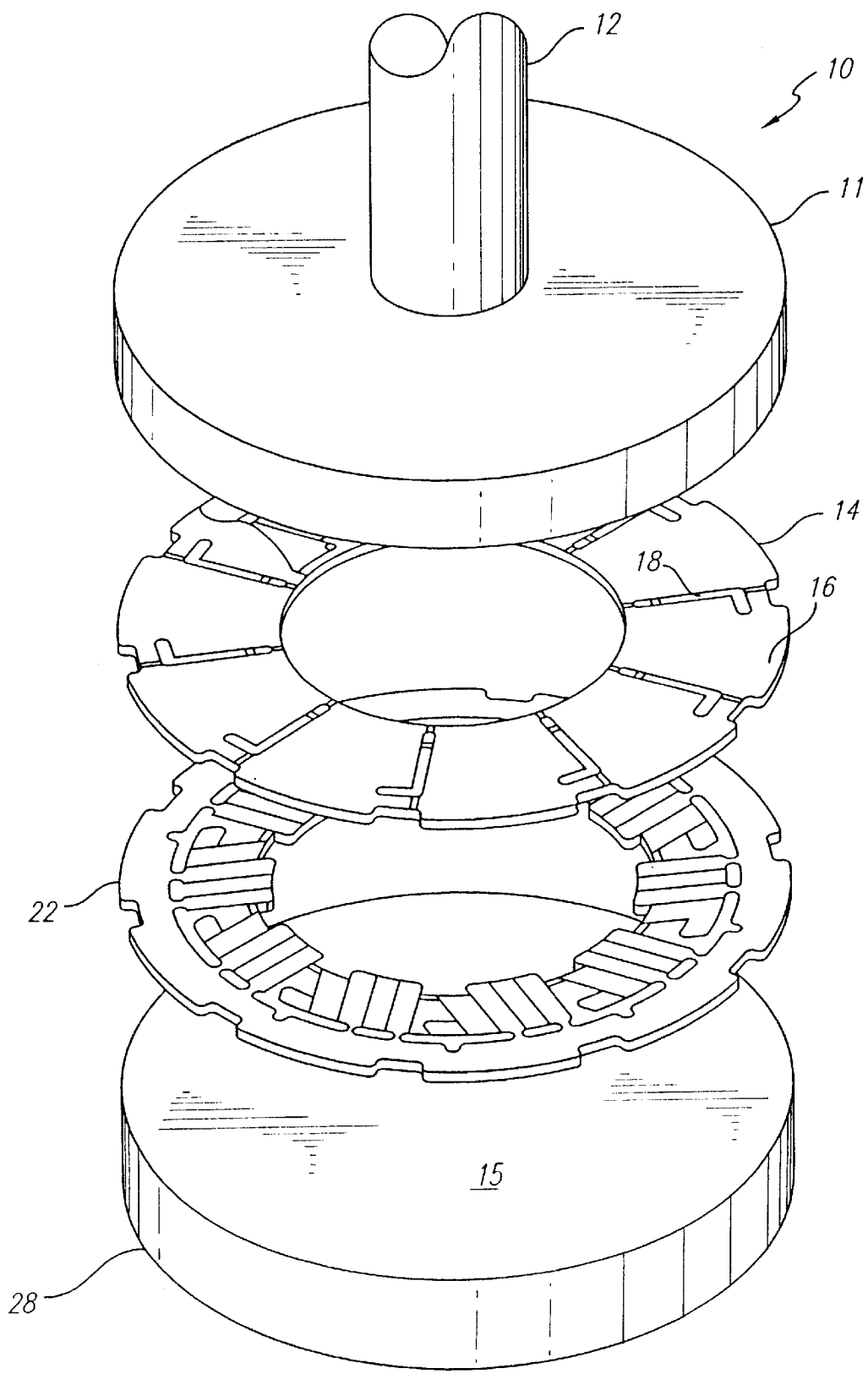
FIG. 1 is an exploded view of a foil thrust bearing according to one embodiment of the present invention.

FIG. 1 shows a foil thrust bearing 10 according to one embodiment of the present invention. The bearing 10 generally comprises the components of a thrust runner 11, a thrust bearing disk 14, an underspring element or thrust bearing stiffener 22, and a thrust plate 28. The above components are typically constructed of nickel-based alloys. While various applications for the bearing 10 are within the scope of the present invention, the bearing 10 is considered to have particular benefit in high speed rotating machinery, such as turboalternator-generators and turbocompressors.

In more particularly describing a first embodiment of the present invention, it can be seen in FIG. 1 that the thrust runner 11 is engaged to a rotating shaft 12, thereby causing the runner 11 to rotate in the direction of the arrow shown in FIG. 1. The runner 11 includes a runner surface 13 that faces opposite a bearing surface 15 of the thrust plate 28. Intermediate the runner 11 and thrust plate 28 is the thrust bearing disk 14.

Figure 2:
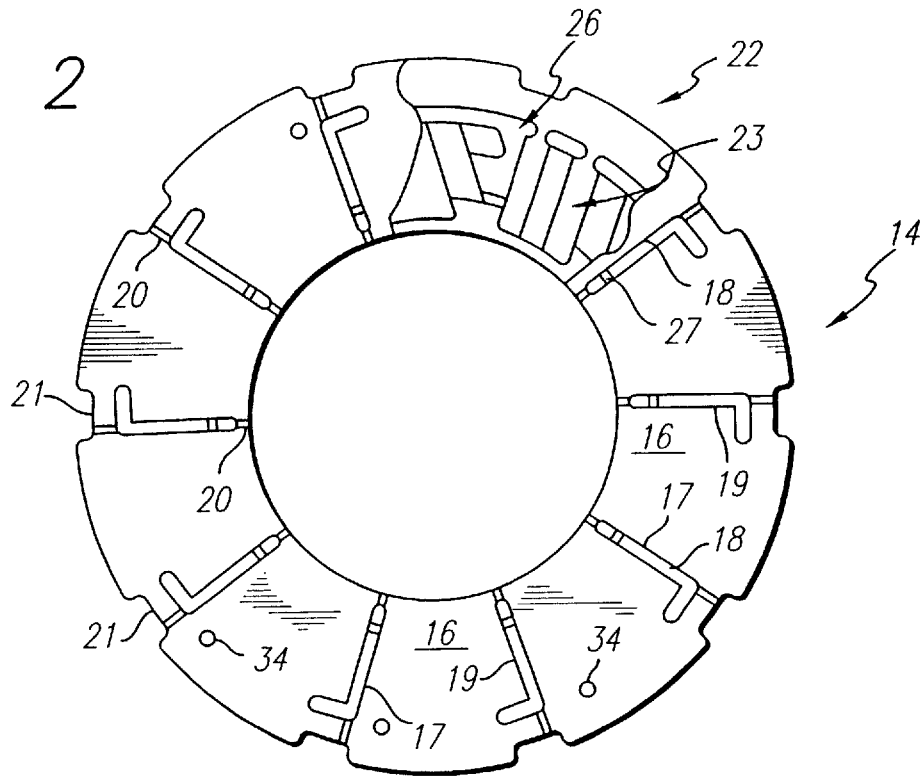
FIG. 2 is a plan view of a thrust bearing disk which can be used in the foil thrust bearing shown in FIG. 1.

In this embodiment of the present invention, and as shown in FIG. 2, the bearing disk 14 is of the type shown in U.S. Pat. No. 4,624,583. The bearing disk is annularly shaped and comprises a plurality of bearing pads or foils 16. The pads 16 are opposed to or face the runner surface 13 when the components of the foil thrust bearing 10 are operatively engaged to one another. As depicted in FIG. 2, each of the pads 16 are substantially annular sector in shape, although other shapes may be employed such as trapezoidal. The pads 16 are circumferentially positioned about the entire surface of the bearing disk 14 that faces the runner surface 13. Thereby, each pad 16 is described by a leading edge 17 and a trailing edge 19, as the runner 11 rotates in the direction shown in FIG. 1. While the present embodiment shows the pads 16 as being substantially equidistant from one another in a circumferential direction, the present invention envisions that unequal spacing may be used. Further, even though FIG. 2 depicts ten (10) pads 16 being employed, the present invention envisions that more or less than ten pads 16 may be useful.

The pads or foils 16 are alternately positioned with a plurality of slots 18, as also seen in FIG. 2. Accordingly, and for this particular embodiment of the invention, one pad 16 is alternately positioned with one slot 18. The function of the slots 18 is to allow a substantially unrestricted flow of fluid (i.e., air) to pass through the bearing disk 14 and form a fluid film between the runner surface 13 and the bearing surface 15. In this particular embodiment, all of the slots 18 are of an L-shaped configuration. Yet, it can be appreciated that all of the slots 18 can be of other configurations, such as that shown in U.S. Pat. No 4,624,583. Further, the slots 18 need not be of the same configuration, and can be varied from one another. Additionally, the slots 18 can be deleted entirely and the bearing 10 can still provide acceptable performance.

Figure 4:
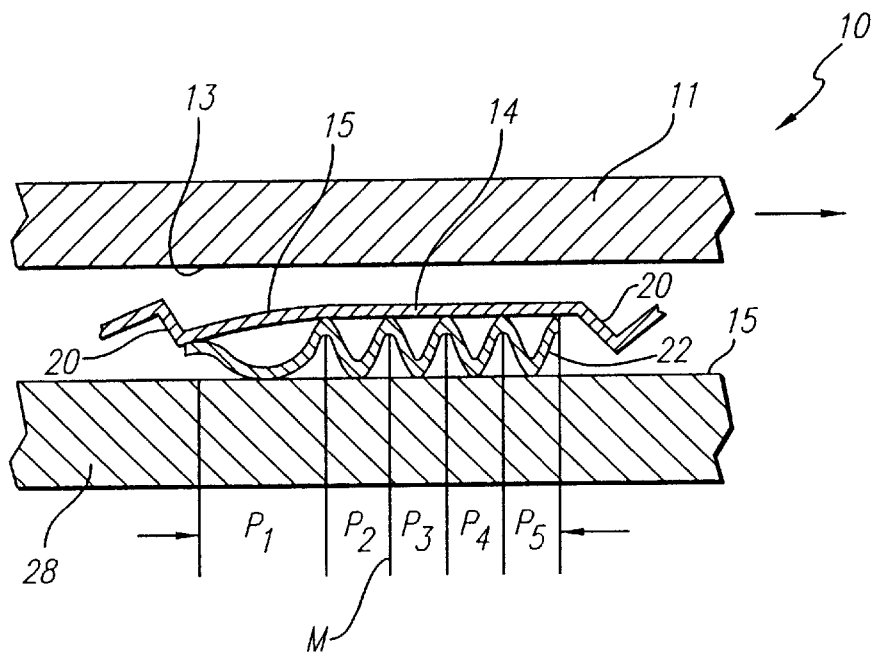
FIG. 4 is a cross sectional view of the foil thrust bearing taken across line 4—4 of FIG. 1.

As best seen in FIGS. 2 and 4, adjacent each slot 18 is a pair of transition areas 20 which create a stepped configuration between adjacent pads 16 and, thus, a stepped configuration over the entire bearing disk 14. Such configuration is also further described in U.S. Pat. No. 4,624,583. The bearing disk 14, in this embodiment, further includes a plurality of notches 21 positioned about the outer or circumferential edge of the bearing disk 14 and adjacent the slots 18. The notches 21 can be aligned with a plurality of notches 30 of the underspring element 22 to fix the rotational position of the disk 14 to the underspring 22, as further described below. The bearing disk 14 also includes a plurality of holes 34 that allow for pins that retain the bearing disk 14 to a housing thrust plate or bearing housing (not shown).

Figure 3:
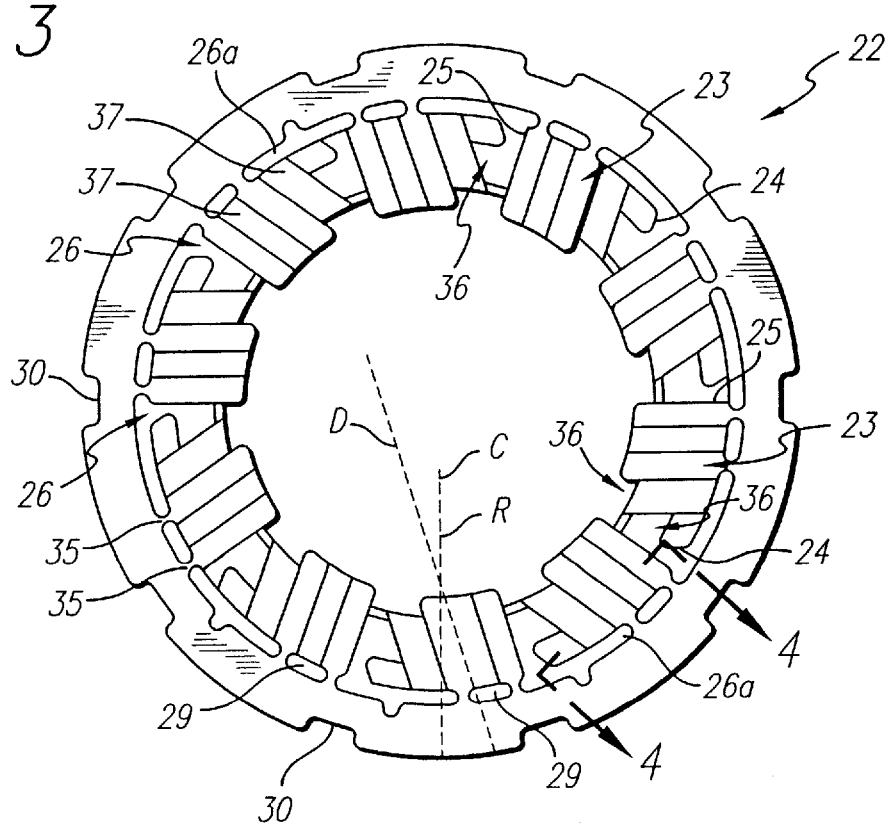
FIG. 3 is a plan view of an underspring element operatively engaged to the bearing disk shown in FIG. 2.

FIG. 2 also shows the bearing disk 14 operatively engaged to the underspring or thrust bearing stiffener 22, while FIG. 3 shows the underspring 22 in greater detail. The underspring 22 is shaped to substantially match the configuration and dimensions of the bearing disk 14. In this embodiment, the underspring element 22 comprises a plurality of spring portions 23, with each portion 23 being positioned under a respective pad 16. As shown in FIG. 3, all of the spring portions 23 have substantially the same configuration and dimensions, with the configuration being somewhat of a parallelogram from a plan view. Nevertheless, it is contemplated by the present invention that all of the spring portions 23 need not be of the same configuration and dimensions. Irrespective of the particular configuration, each spring portion 23 comprises a leading edge 24 and a trailing edge 25, as determined by the direction of rotation of the runner 11. The circumferential positioning of the leading and trailing edges 24, 25 of any one spring portion 23 are substantially the same as the positioning of the leading edge 17 and trailing edge 19 of the pad 16 that respectively overlays such spring 23. Further, although different spacing can be employed, the present embodiment has the spring portions 23 substantially equidistant from one another in their circumferential positions.

This preferred embodiment of the spring portions 23 incorporates a cross sectional configuration that is periodic, as best seen in FIG. 4. While the cross sectional configuration in FIG. 4 is corrugated, other cross sectional configurations may be used. The periodic configuration is described by a plurality of varying pitches $P_1$ to $P_x$. In general, and as further described below, the pitches are varied in size to correlate with a varying fluid film pressure that develops between the runner surface 13 and the bearing surface 15. In particular, the pitches in any one spring portion 23 decrease from the leading edge 24 and towards the trailing edge 25. More specifically, with each spring portion 23 having a circumferential mid-point or, in other words, a mid-point between the leading and trailing edges 24, 25, the pitch sizes decrease in a stepwise fashion from the leading edge 24 and substantially to the mid-point. From the mid-point, the pitch sizes substantially remain the same to the trailing edge 25.

Figure 5:
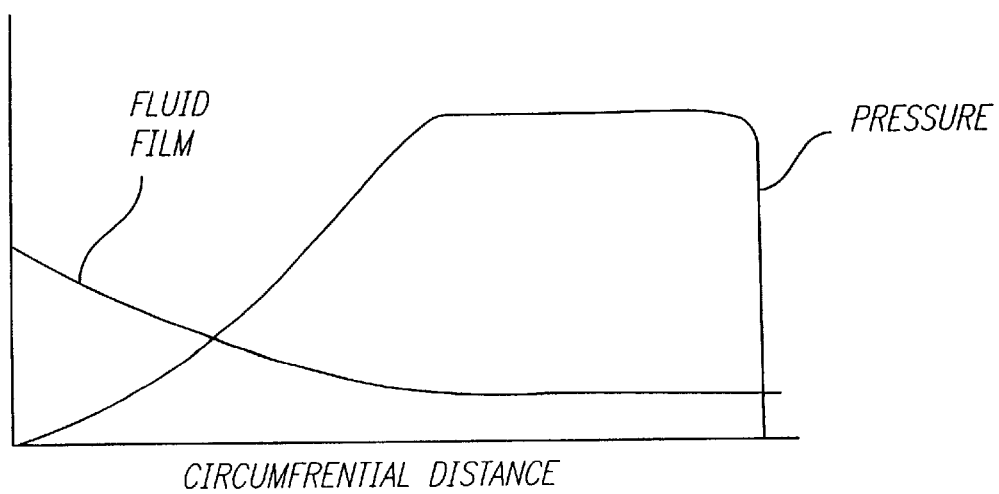
FIG. 5 is a plot of fluid film thickness and pressure versus circumferential distance over the foil thrust bearing shown in FIG. 1.

For purposes of illustration, FIG. 4 depicts the stepwise decrease in pitch size for a single spring portion 23. A circumferential mid-point is designated "M." The various pitches have a size or distance wherein $P_1 > P_2 > P_3$, while $P_3 = P_4 = P_5$. As noted above, the pitches are varied to correlate with a varying fluid film pressure. This correlation can be explained by reference to FIG. 5. The plot in FIG. 5 depicts typical operating characteristics for a foil thrust bearing in the current art. The thickness of the fluid film that develops between a thrust runner and a bearing disk typically decreases in thickness from the leading edge of the underspring to about its circumferential mid-point. Thereafter, the thickness of the fluid film tends to remain the same. Conversely, in the typical bearing, fluid film pressure increases from the leading edge until about the mid-point and then tends to remain the same. Thus, a correlation between the underspring force and fluid pressure requires the spring force to generally increase from the leading edge and to the circumferential mid-point; thereafter, the spring force should remain substantially the same. To alter the force in a spring at any given point, the present invention alters the pitch about such point.

In again referring to FIG. 3, the underspring element or thrust bearing stiffener 22 is described by a center C from which a radial line R extends to the outer or circumferential edge of the underspring 22. It can be seen that a directional line D describes a direction along which the longitudinal axes of the corrugations for the spring portions 23 lie. The direction D, in this embodiment, intersects the radial line R. From the existence of such intersection, it can be appreciated that the spring portions 23 lie obliquely to the actual radial lines of the underspring 22. At the same time, the spring portions 23 have their longitudinal axes generally perpendicular to the direction of travel of the runner 11. The perpendicular orientation enables the stiffness of the underspring element 22 to vary in the circumferential direction.

The underspring or stiffener 22 further includes a plurality of first connecting elements 27 that are circumferentially positioned about an inner edge of the underspring 22 to provide a physical connection between adjacent spring portions 23. A pair of second connecting elements 35 are fixed between each spring portion 23 and an outer or circumferential edge area of the underspring 22. The second connecting elements 35 provide a means for fixing the spring portions 23 to the remaining part of the underspring 22. Disposed intermediate each pair of second connecting elements 35 is a second aperture 29 that is intended to allow an area to terminate the spring portion 23 form. A total of four attachments (i.e., two connecting elements 27 and two connecting elements 35) are shown in FIG. 3 to keep the spring portions 23 in the proper orientation with respect to the bearing 10. However, two or three attachments can also provide a sufficient restraint. Alternatively, the spring portions 23 can be welded to a separate plate as shown in U.S. Pat. No. 5,498,082.

Also included in the stiffener 22 is a plurality of first apertures 26 disposed among the spring portions 23. Thereby, a single aperture 26 is alternately positioned with a single spring portion 23 in a circumferential fashion. For this embodiment, all of the first apertures 26 are of substantially the same configuration and dimension, although the configurations and dimensions can be changed. The first apertures 26 shown in FIG. 3 are somewhat triangular shaped and have a leg 26a that extends under a portion of the spring portion 23 in order to allow an area to terminate the spring portion 23 form. The first apertures 26 provide physical separation between each spring portion 23.

As with the bearing disk 14, the underspring 22 includes a plurality of notches 30 located about the outer edge. The notches 30 are preferably configured, dimensioned and circumferentially positioned to match the notches 21 of the bearing disk 14. Various means, such as dowel pins, can then be used to rotationally fix the relative positions of the bearing disk 14 and the underspring 22. Then, the disk 14 and the underspring 22 can be fixed to the thrust plate 28.

In making the underspring or stiffener 22 of the present invention, conventional methods can be utilized. For example, most of the underspring 22, including the spring portions 23, can be stamped. The first and second apertures 26, 31 can be formed by photochemical machining or mechanical punching. However, it can be appreciated that, in contrast to the prior art, the present invention eliminates certain manufacturing steps. For example, to create the multiple apertures of multiple sizes in U.S. Pat. No. 5,248,205, a relatively large number of processing steps is required. On the other hand, the underspring 22 of the present invention has a relatively small number of different apertures and sizes that can be created in a relatively small number of processing steps.

When the foil thrust bearing 10 is operative, the shaft 12 rotates and the runner 11 likewise rotates. As the runner 11 rotates, a fluid film is built up between the runner surface 13 and the bearing surface 15. For each of the pads or foils 16, the fluid film pressure increases from the leading edge 19 and to the trailing edge 17. At the same time, each of the spring portions 23 provides load support to their respective pads 16. In particular, the spring portions 23 provide varying support by virtue of their having varying spring stiffness in a circumferential direction. Additional variance in the circumferential direction can be accomplished by varying direction D with respect to a radial line R. The typical design has an increasing stiffness from the inside diameter to the outside diameter. Due to the particular varying stiffness, the spring portions 23 and, consequently, the pads 16 can match the varying fluid film pressure profile.

In addition to varying circumferential stiffness, the embodiment shown in FIGS. 3 and 4 provide for varying radial stiffness. Variance in the radial direction is accomplished by a plurality of notches 36 that vary the number of corrugations (i.e., periodic elements) at different radii. As best seen in FIG. 3, the notches 36 essentially represent the space void from one sized periodic element to the next sized periodic element. Thereby, the longitudinal lengths of the corrugations along direction D are varied. Moreover, the periodic elements are formed into periodic element groups, with each group being at a different radii of the underspring element 22. As can be understood, a greater number of corrugations in any one periodic element group will tend to increase stiffness, while a smaller number of corrugations in any one periodic element group will tend to decrease stiffness.

For purposes of example, in FIG. 3, each spring portion 23 is shown with two notches 36. However, it should be understood that the present invention contemplates that the number of notches in each spring portion 23 need not be the same. Furthermore, even though the embodiment in FIG. 3 depicts notches 36 in each spring portion 23, it is contemplated that not all of the spring portions 23 will have notches 36. Further yet, the present invention contemplates that varying radial stiffness and varying circumferential stiffness need not be simultaneously provided, and that only one type of stiffness can be provided.

To those skilled in the art, it can be appreciated that the present invention provides an improved foil thrust bearing and, specifically, an improved underspring or thrust bearing stiffener. An improved foil thrust bearing according to the present invention provides variable circumferential stiffness, which variance can be optimized for the given application. Additionally, the present invention provides variable radial stiffness. Further, the present invention provides for variable circumferential stiffness by a manufacturing method which eliminates the need for a large number of manufacturing steps to make various sized apertures, for example, in each spring portion of the underspring or stiffener. Also provided by the present invention is an improved combination of a bearing disk and underspring that can reduce the overall manufacturing cost of the foil thrust bearing, while providing a means for variable circumferential and radial stiffness.

It should be understood, of course, that the foregoing relates to preferred embodiments of the invention and that modifications may be made without departing from the spirit and scope of the invention as set forth in the following claims.

We claim:

1. In an improved foil thrust bearing having a thrust runner and a thrust bearing disk, wherein the improvement comprises:

an underspring element operatively engaged with said disk, said underspring element comprising:
a plurality of spring portions having a periodic configuration, said spring portions comprising a leading edge and a trailing edge, said periodic configuration being defined by a plurality of pitches that vary in size between said leading and trailing edges; and
a plurality of first apertures disposed among said spring portions.

2. The improvement of claim 1, wherein said pitches decrease in size from said leading edge and towards said trailing edge.

3. The improvement of claim 1, wherein said pitches decrease in size to correlate with a varying fluid pressure capable of being developed between said disk and said runner.

4. In an improved foil thrust bearing having a thrust runner and a thrust bearing disk, wherein the improvement comprises:
an underspring element operatively engaged with said disk, said underspring element comprising:
a plurality of spring portions having a periodic configuration, said spring portions comprising a leading edge and a trailing edge, said periodic configuration being defined by a plurality of periodic elements that vary in longitudinal size between said leading and trailing edges; and
a plurality of first apertures disposed among said spring portions.

5. The improvement of claim 4, wherein said periodic elements decrease in longitudinal size from said leading edge and towards said trailing edge.

6. The improvement of claim 4, wherein said periodic elements decrease in size to correlate with a varying fluid pressure capable of being developed between said disk and said runner.

7. In an improved foil thrust bearing having a thrust runner and a thrust bearing disk, wherein the improvement comprises:
an underspring element operatively engaged with said disk, said underspring element comprising:
a plurality of spring portions grouped into a plurality of periodic element groups at different radii of said underspring element;
said spring portions having a corrugated configuration and comprising a leading edge and a trailing edge, said configuration being defined by a plurality of periodic elements that decrease in length from said leading edge to said trailing edge and a plurality of pitches that vary in size to correlate with a varying fluid pressure capable of being developed between said disk and said runner.

8. The improvement of claim 7, wherein said pitches of at least one of said spring portions decrease in size from said leading edge and substantially to a circumferential mid-point of said one spring portion.

9. The improvement of claim 7, wherein said pitches are substantially equal in size between said mid-point and said trailing edge of said one spring portion.

10. The improvement of claim 7, further comprising a plurality of first connecting elements that connect said spring portions to one another.

11. The improvement of claim 7, further comprising a plurality of first apertures disposed in an alternating fashion with said spring portions.

12. In an improved foil thrust bearing having a thrust runner and a thrust plate, wherein the improvement comprises:
an underspring element positioned adjacent to said thrust plate, said underspring element comprising at a plurality of alternating first apertures and spring portions, at least one spring portion having a periodic configuration and comprising a leading edge and a trailing edge, said periodic configuration being defined by a plurality of periodic element groups at varying radii of said underspring element and a plurality of pitches that vary between said leading and trailing edges; and
a thrust bearing disk disposed intermediate said underspring element and said thrust runner, said disk comprising a plurality of transition areas that provide a stepped configuration to said disk, said transistion areas being positioned to substantially match a plurality of circumferential positions of said first apertures.

13. The improvement of claim 12, wherein said transition areas comprise a plurality of slots.

14. A foil thrust bearing for a rotating machine, comprising:
a thrust runner;
a thrust plate oppositely facing said runner;
an underspring element operatively engaged to said thrust plate and comprising a plurality of alternating first apertures and spring portions, each spring portion having a corrugated configuration and comprising a leading edge and a trailing edge, said configuration being defined by a plurality of periodic elements that increase in length from said leading edge and to said trailing edge and a pitch that decreases from said leading edge and substantially to a circumferential mid-point of each of said spring portions, said pitch being substantially constant from said mid-point to said trailing edge; and
a thrust bearing disk operatively engaged to said underspring element, said disk having a plurality of transition areas that provide a stepped configuration to said disk, said transition areas being positioned to substantially match a plurality of circumferential positions of said first apertures.

* * * * *